United States Patent [19]

Jackson

[11] Patent Number: 4,875,097
[45] Date of Patent: Oct. 17, 1989

[54] PERSPECTIVE PROCESSING OF A VIDEO SIGNAL

[75] Inventor: Richard A. Jackson, Nevada City, Calif.

[73] Assignee: The Grass Valley Group, Inc., Grass Valley, Calif.

[21] Appl. No.: 203,575

[22] Filed: May 26, 1988

Related U.S. Application Data

[63] Continuation of Ser. No. 922,633, Oct. 24, 1986, abandoned.

[51] Int. Cl.$^4$ ...................... H04N 3/223; H04N 5/262
[52] U.S. Cl. .................................. 358/180; 340/729; 358/183; 358/182
[58] Field of Search ................. 358/180, 182, 183, 22; 340/747, 727, 725, 729; 364/522

[56] References Cited

U.S. PATENT DOCUMENTS

| | | | |
|---|---|---|---|
| 3,555,349 | 1/1971 | Munz | 358/88 X |
| 4,156,237 | 5/1979 | Okada et al. | 340/729 X |
| 4,182,053 | 1/1980 | Allen et al. | 340/725 X |
| 4,209,832 | 6/1980 | Gilham et al. | 340/725 X |
| 4,302,776 | 11/1981 | Taylor et al. | 358/180 X |
| 4,317,114 | 2/1982 | Walker | 340/747 X |
| 4,384,338 | 5/1983 | Bennett | 340/729 X |
| 4,439,760 | 3/1984 | Fleming | 340/747 X |
| 4,475,104 | 10/1984 | Shen | 340/747 X |
| 4,591,897 | 5/1986 | Edelson | 358/22 |
| 4,591,913 | 5/1986 | Pohl | 358/22 X |
| 4,600,200 | 7/1986 | Oka et al. | 340/725 X |
| 4,600,919 | 7/1986 | Stern | 340/725 |
| 4,609,917 | 9/1986 | Shen | 340/729 |
| 4,620,228 | 10/1986 | Mikado | 358/22 X |
| 4,642,676 | 2/1987 | Weinger | 358/22 |
| 4,667,236 | 5/1987 | Dresdner | 340/727 X |
| 4,679,040 | 7/1987 | Yan | 340/729 X |
| 4,679,041 | 7/1987 | Fetter et al. | 340/729 X |
| 4,682,217 | 7/1987 | David et al. | 340/729 X |
| 4,684,990 | 8/1987 | Oxley | 340/729 X |
| 4,709,393 | 11/1987 | Taylor et al. | 358/22 X |
| 4,758,892 | 7/1988 | Bloomfield | 358/182 X |

FOREIGN PATENT DOCUMENTS

| | | | |
|---|---|---|---|
| 0082489 | 6/1983 | European Pat. Off. | 358/160 |
| 86/00454 | 1/1986 | PCT Int'l Appl. | 340/747 |

OTHER PUBLICATIONS

Leonard, Considerations Regarding the Use of Digital Data to Generate Video Backgrounds, Aug. 1978, pp. 499–503.

*Primary Examiner*—James J. Groody
*Assistant Examiner*—E. Anne Faris
*Attorney, Agent, or Firm*—Francis I. Gray; John Smith-Hill

[57] ABSTRACT

A video signal representing a scene is processed by combining it with a second signal having a value which depends on the depth of the scene as a function of position.

19 Claims, 3 Drawing Sheets

PERSPECTIVE PROCESSING OF A VIDEO SIGNAL

This is a continuation of application Ser. No. 922,633 filed 10/24/86 and now abandoned.

This invention relates to a method and apparatus for processing a video signal.

BACKGROUND OF THE INVENTION

A television picture is a representation in substantially planar form of a scene that is composed by the producer of a television program. The scene may be composed of tangible objects, or it may be at least partially synthesized by artificial means, e.g. a television graphics system, so that the source of the video signal representing the scene is not a camera or a film scanner but a frame buffer and a computer used for adjusting the contents of the frame buffer. Generally the scene is made up of two component scenes, namely a foreground scene and a background scene, that are combined using a travelling matte technique. For example, the foreground scene might contain an annulus against a solid color matte and the background scene a square against a screen of contrasting color, as shown in FIGS. 1(a) and 1(b) respectively, so that when the foreground and background scenes are combined the resulting picture has the appearance shown in FIG. 1(c).

A transform system operates on the video signal representing a scene, and may be used to carry out a spatial transformation on the scene. For example, the scene may be displaced to the right. If the foreground video signal representing the FIG. 1(a) scene is applied to a transform system which carries out a transformation on the signal such that the transformed signal represents the scene shown in FIG. 1(d), in which the annulus of the FIG. 1(a) scene has been shifted to the right, then the signal obtained by combining the transformed foreground signal with the background signal might represent the picture shown in FIG. 1(e). Most transform systems are of two main kinds, known as the forward transform system and the reverse transform system. FIG. 2 represents a frame-based reverse transform system based on principles that are known at present. It is believed that the FIG. 2 system does not exist in the prior art, and it is being described in order to provide information that will be useful in understanding the invention.

The transform system shown in FIG. 2 operates by digitizing the input video signal under control of a write clock 10 and writing the resulting sequence of digital words, into a video frame buffer 12 using addresses generated by a forward address generator 14. The input video signal is derived from an analog composite video signal in conventional interlaced format by separating it into its components (normally luminance and chrominance) and digitizing each component. The frame buffer 12 therefore has a memory for storing the luminance component and a memory for storing the chrominance components. However, since the components are acted on in like manner in the transform system, it is not necessary to consider the components separately. The operation of digitizing the video signal effectively resolves each raster line of the picture into multiple pixels, e.g. 720 pixels, that are small, but finite, in area. The location of a pixel in the scene can be defined by a two-coordinate display address (U, V) of the input screen (FIG. 1(a), e.g.). The address space of the video frame buffer is organized so that there is one-to-one correspondence between the display addresses and the memory addresses generated by the forward address generator 14. Thus, the digital word representing the pixel having the display address (U, V) is written into the frame buffer 12 at a location that has a memory address that can be expressed as (U, V).

In order to read an output video signal from the frame buffer 12, a read address counter 16 operates under control of a read clock 17 to generate a sequence of addresses (X, Y) defining the locations in the output screen (FIG. 1(d)) of the pixels that will be successively addressed. The coordinate values X and Y each have the same number of significant digits as the coordinate values U and V respectively. Accordingly, the display addresses (X, Y) define the same possible pixel positions in the output display space as are defined in the input display space by the display addresses (U, V). However, the display addresses (X, Y) are not used directly to read the output video signal from the frame buffer. A reverse address generator 18 receives the output scene display addresses (X, Y) and multiplies them by a transform matrix T' to generate corresponding memory addresses (X', Y') which are used to read the video signal from the frame buffer. The transform matrix T' is applied to the reverse address generator 18 by a user interface 19, and defines the nature of the transform that is effected by the reverse transform system. If, for example, it is desired to effect a transformation in which the input scene is displaced diagonally upwards and to the left by an amount equal to the inter-pixel pitch in the diagonal direction, the transform matrix would be such that the memory address (X', Y') that is generated in response to the display address (X, Y) would be (X+1, Y+1), assuming that the origin of the coordinate system is in the upper left corner of the input and output scene, the values of X and Y increase to the right and downwards respectively.

In the general case, it is not sufficient for the values of X' and Y' to be related to X and Y by addition or subtraction of integers, and therefore the memory address coordinates X' and Y' have more significant digits than the display address coordinates X and Y. The reverse addresses are applied not only to the frame buffer 12 but also to a video interpolator 20. For each reverse address (X', Y'), the frame buffer outputs the respective digital words representing an array of pixels surrounding the point defined by the reverse address (X', Y'). For example, the data words representing the four pixels nearest the point defined by the address (X', Y') might be provided. These four data words are applied to the interpolator 20, and the interpolator combines these four digital words into a single digital output word based on the fractional portion of the address (X', Y'). For example, using decimal notation, if the least significant digit of each coordinate X and Y is unity but the least significant digit of the coordinates X' and Y' is one-tenth, and the counter 16 generates the read address (23, 6) which is converted to a reverse address (56.3, 19.8) by being multiplied by the transform matrix T', the frame buffer 12 responds to the reverse address (56.3, 19.8) by providing the digital words stored at the addresses (56, 19), (56, 20), (57, 19) and (57, 20) and the interpolator 20 combines them into a single digital output word by weighting them 3:7 in the horizontal direction and 8:2 in the vertical direction. This digital word defines the value that is to be generated at the location of the output screen that is defined by the display address (23, 6).

The range of possible reverse addresses is greater than the range of memory addresses defining locations in the frame buffer 12, so that a validly generated reverse address might define a location that does not exist in the frame buffer's address space. Therefore, the reverse addresses are also applied to an address limit detector 22 which responds to an invalid reverse address (an address which defines a location outside the address space of the frame buffer 12) by providing a signal which causes a video blanker 24 to inhibit the output signal of the frame buffer.

In parallel with the video channel comprising the video frame buffer 12, the video interpolator 20 and the video blanker 24 is a key channel comprising a key frame buffer 26, a key interpolator 28 and a key blanker 30. A key signal that is applied to the key channel provides opacity information about the foreground video signal applied to the video channel. This opacity information defines where and the extent to which a background scene represented by a background video signal can be seen in a composite picture (FIG. 1(c)) formed by mixing the foreground and background video signals under the influence of the key signal. Outside the boundaries of the foreground objects, the foreground scene is transparent (key=0) and the background scene is seen without modification by the foreground scene. If a foreground object is fully opaque (key=1), the background scene is fully obscured by the foreground object, but if a foreground object is only partially transparent (0<key<1) the background video signal is mixed with the foreground video signal in proportion to the value of the key. Because the foreground scene is transformed by the video channel, it is necessary to transform the key in the identical manner in order to maintain congruence between the foreground scene and the key. Therefore, the key signal is processed in the key channel in the same way as the foreground signal is processed in the video channel. Thus, the key signal undergoes the same spatial transformation and interpolation as the foreground signal, and is subject to the same address limit blanking.

The transform matrix T' must be the mathematical inverse of the desired spatial transform T, and therefore this known transform system is called a reverse transform system.

It will be understood that even though a television picture is strictly two dimensional (X and Y), a third dimension (Z) must be accommodated if effects simulating movement towards or away from the viewpoint are to be provided. Accordingly, a reverse transform generator must normally have available to it, and carry out computations using, signals representing pixel positions in three dimensions.

SUMMARY OF THE INVENTION

In a preferred embodiment of the present invention, a video signal representing a scene is processed by combining it with a second signal having a value which is a measure of the depth of the scene as a function of position.

BRIEF DESCRIPTION OF THE DRAWINGS

For a better understanding of the invention, and to show how the same may be carried into effect, reference will now be made, by way of example, to the accompanying drawings in which:

In FIGS. 2 and 3, like reference numerals designate corresponding components.

DETAILED DESCRIPTION

Figure 3:
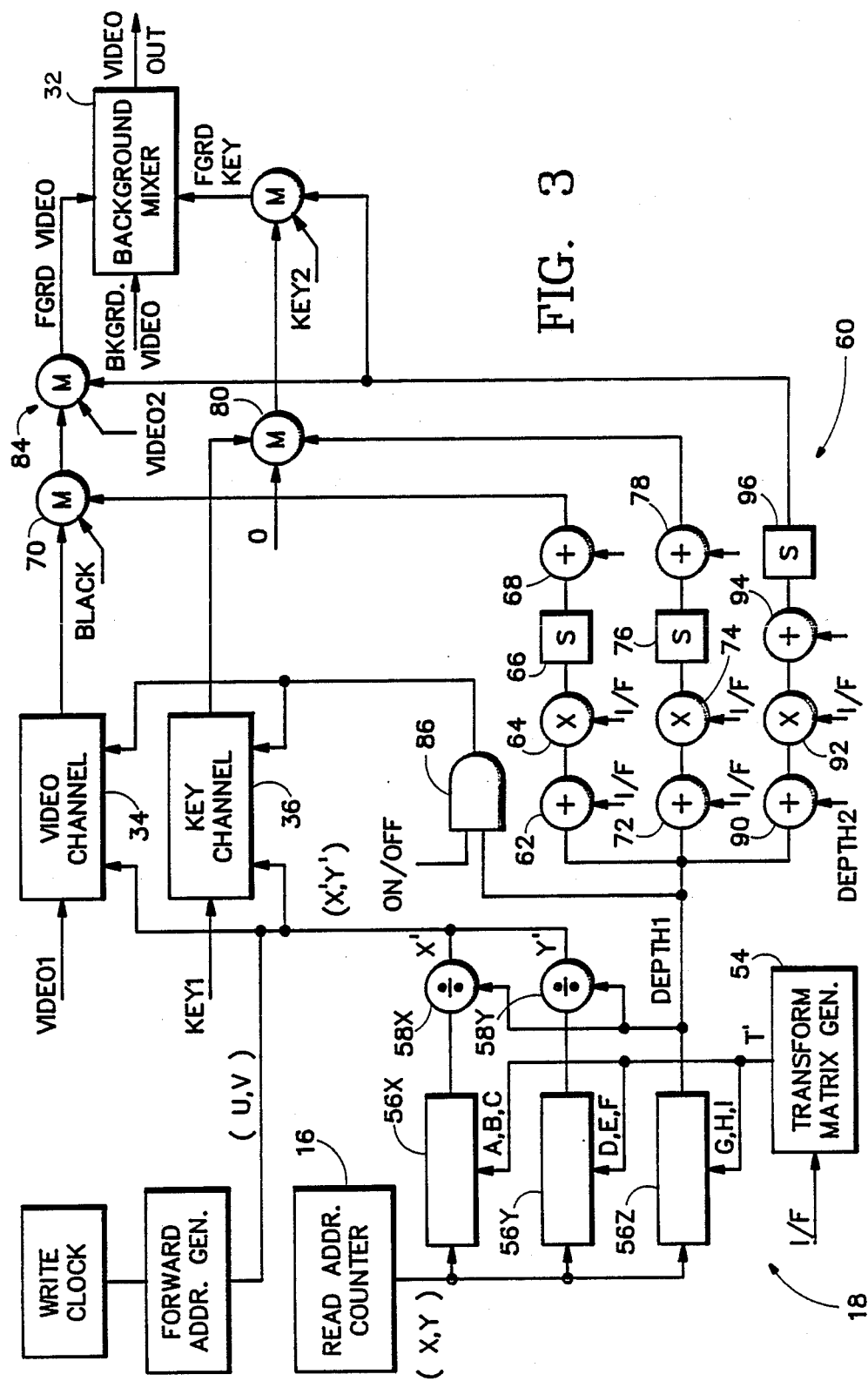
FIG. 3 is a block diagram of a reverse transform system that embodies the present invention.

The special effects system shown in FIG. 3 is based on a reverse transform system.

Some elements of the reverse transform system have been omitted from FIG. 3 for the sake of clarity. In particular, the video channel and the key channel are shown as respective blocks 34 and 36, and the address limit detector is not shown in FIG. 3.

In spatial transformation of a two-dimensional scene, the pixel at a location having a display address (X, Y) in the output screen is derived from a pixel at a location having a display address (X', Y') in the input screen such that $$X' = \frac{AX + BY + C}{GX + HY + I}$$

$$Y' = \frac{DX + EY + F}{GX + HY + I}$$

where the coefficients A–I are field-constant values that define the spatial transformation.

Figure 1A:
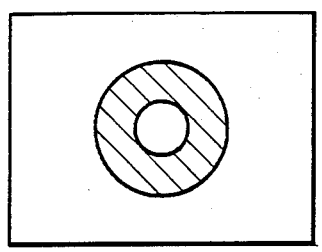
FIG. 1 is a series of screens illustrating transformation of a foreground scene.
Figure 1B:
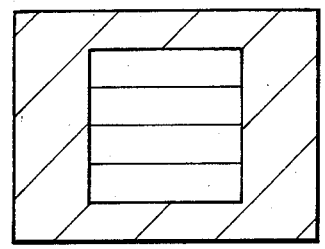
Figure 1C:
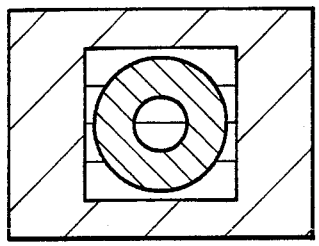
Figure 1D:
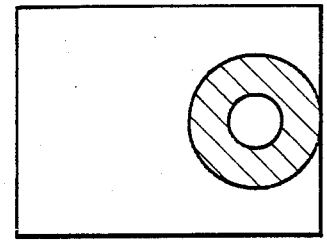
Figure 1E:
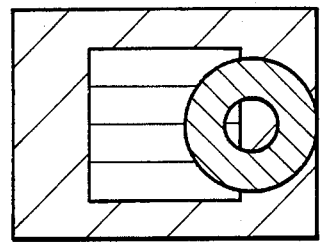
Figure 2:
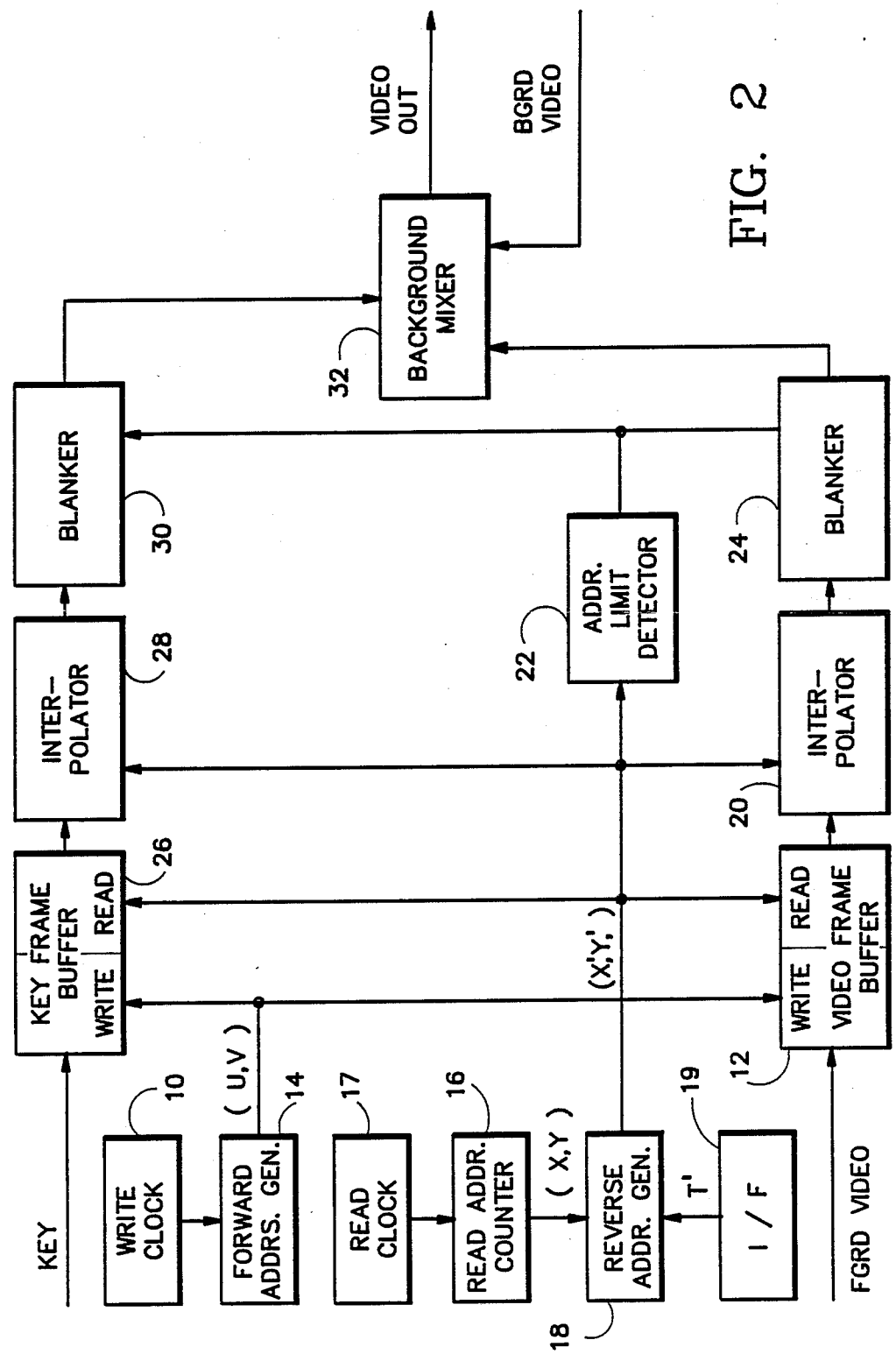
FIG. 2 is a block diagram of a reverse transform system.

The reverse address generator is shown in greater detail in FIG. 3 than in FIG. 2. The reverse address generator comprises a transform matrix generator 54 which generates the coefficients A–I that compose the reverse transform matrix T'. These coefficients are generated in response to signals received from an operator interface (I/F) indicating the nature of the transformation to be executed. The three groups of coefficients A,B,C; D,E,F and G,H,I are applied to respective processing circuits 56X, 56Y and 56Z. The processing circuits 56 each receive the address signal (X, Y) from the read address counter 16 and provide as their respective output signals the values AX+BY+C, DX+EY+F and GX+HY+I. The output signals of the circuits 56X and 56Y are applied as numerator inputs to respective division circuits 58X and 58Y, each of which receives the output signal of the circuit 56Z as its denominator input. The output signals of the circuits 58X and 58Y therefore represent X' and Y' respectively and are applied to the video and key channels. In general, the coefficients A–F are used for flat transforms (X/Y scaling, X/Y translation or Z-axis rotation), and the coefficients G–I are functions of the perspective viewpoint and the Z-location of the pixel having the display address (X', Y'). If there is no perspective (the viewpoint is infinitely distant from the scene) or if no X- or Y-axis rotation or Z-axis translation is called for, G and H are each zero and I is one and the denominator of each equation is one. Conversely, a non-unity denominator causes the values of X' and Y' to vary on a pixel-by-pixel (G not equal to zero), line-by-line (H not equal to zero) and/or field-constant (I not equal to one) basis. If the denominator is less than unity, the pixel that was at the location (X, Y) (and has been transformed to the location (X', Y')) appears to have moved away from the viewer, whereas if the denominator is greater than unity the pixel appears to have moved towards the viewer.

Therefore, the denominator of the spatial transformation equations provides a measure of the apparent distance of a pixel from the viewer. Accordingly, the signal provided by the processing circuit 56Z and having the value $GX+HY+I$ is representative of the apparent depth of each pixel of the scene represented by the transformed video signal. The depth signal is applied to a perspective processor 60 that receives the transformed video and key signals from the video and key channels. The perspective processor has four distinct processing channels for the depth signal, namely a perspective dim channel, a perspective face channel, a perspective clip channel and an intersecting planes channel.

In the perspective dim channel, the depth signal is first applied to a subtraction circuit 62 in which it is subtracted from a signal defining a datum value for the apparent depth. The datum value represents the apparent depth of a reference or start plane. If the apparent depth indicated by the depth signal is less than the datum value, this implies that the pixel is closer to the viewpoint than is the start plane, and the output signal of the subtraction circuit 62 is forced to zero and the depth signal has no effect on the output of the perspective dim channel. If the apparent depth indicated by the depth signal is greater than the datum value, the output signal of the subtraction circuit represents the depth of the pixel relative to the start plane.

The output signal of the subtraction circuit 62 is applied to a multiplier 64, in which the signal representative of relative depth is multiplied by a gain factor. The value of the gain factor can range from zero to very large (typically 1024). If the gain factor is less than one, the sensitivity of the following stages to the relative depth value is decreased, whereas if the gain factor is greater than one, the sensitivity is increased. The output of the multiplier 64 is applied to a clipper and shaper 66, in which the output signal of the multiplier is limited to a maximum value of 1.0 and shaped so that the output signal of the clipper and shaper 66 has no slope discontinuities. This is done in order to ensure that the transition from no dimming (relative depth less than zero) to dimming (relative depth greater than zero) does not generate Mach bands. In a summation circuit 68, an offset value, which controls a static dim, is added to the output signal of the clipper and shaper, and the sum is again clipped to 1.0. The resulting control signal is used to drive the control port of a video mixer 70 which receives the output signal of the video channel and black video at its signal ports respectively. The mixter 70 is set up so that the output signal from the video channel is passed without change for a control value of zero, black video is passed for a control value of one, and a proportional mix is performed between the output signal of the video channel and black video for control values between zero and one. The output of the key channel is not affected by the control signal provided by the perspective dim channel. The effect of perspective dim is that an increasing amount of black is mixed with the output signal of the video channel as the control value increases. Thus, as the apparent depth of the scene represented by the output signal of the video channel increases, temporally (frame-by-frame) and/or spatially (line-by-line or pixel-by-pixel), the scene become darker.

By subtracting the depth signal from the signal defining the datum value, the perspective dim effect is limited to pixels that are at a depth that is greater than that of the start plane. The static dim offset establishes a minimum value for the depth control signal provided by the perspective dim channel: even pixels that are at a depth that is less than that of the start plane are subject to the static dim. The gain factor applied to the multiplexer 64 determines how rapidly the scene dims as it recedes from the viewer.

The perspective fade circuit is similar to the perspective dim circuit, except that the control signal is applied to a key mixer 80 instead of to the video mixer 70. The output signal of the key blanker of the key channel 36 is passed without change to the background mixer for a control value of zero, a zero key signal is passed to the mixer 32 for a control value of one, and a proportional mix is performed between the output of the key blanker and a zero key for control values between zero and one. Therefore, the key signal provided at the output of the key mixer 80 varies in dependence on the key depth control signal from a minimum value of zero to a maximum value that is equal to the value of the output signal of the key channel. The output signals of the video and key mixers 70 and 80 are applied to the background mixer 32 through a video combiner 84. The combiner 84 is of the same general type as that described and claimed in co-pending patent application Ser. No. 221,005 which is a continuation of patent application Ser. No. 836,945 filed Mar. 6, 1985, and its operation will be described below. However, for present purposes it is assumed that the combiner has no effect on the output signals of the mixers 70 and 80. When the output signals of the video and key mixers are applied to the background mixer as foreground and video key signals, and the output signal of the key mixer changes in response to change in the key depth control signal, the opacity of the foreground scene in the picture represented by the full-field output signal of the mixer 32 changes: as the key value is forced towards zero from one, the opacity of the foreground scene decreases, with the result that the background mixer mixes in more background video and makes the foreground scene appear to fade into the background as it recedes from the viewer. The datum value, the static fade offset and the gain factor that are applied to the depth signal in the circuits 72, 78 and 74 respectively have analogous effects to the corresponding values applied to the depth signal in the perspective dim channel.

The perspective dim effect and the perspective fade effect may be invoked simultaneously. A single perspective dim/perspective fade channel may be used to generate a depth control signal that is applied selectively to the control port of the mixer 70 and/or to the control port of the mixer 80.

A television picture is seen in two dimensions as a projection of a scene onto a projection plane. The projection occurs relative to the viewpoint. When the scene is spatially transformed such that pixels move in the Z-direction, whether due to Z-axis translation or X- or Y-axis rotation, there is a possibility that pixels will be transformed to locations that are behind the viewpoint. When that occurs, an inverted replica of portions of the transformed scene is created in the projection plane. Since the viewer should not normally be able to see in the projection plane portions of the scene that lie on the other side of the viewer from the projection plane, it is desirable that these wrap-around portions of the scene be blanked. It can be shown that wrap-around occurs when the denominator of the transform equations is negative. Therefore, the sign bit of the depth signal generated by the processing circuit 56Z is applied to one input of an AND gate 86 which receives an on/off signal from the operator interface at its other input. The output of the AND gate 86 is applied to the blankers of the video and key channels. When the on/off signal is asserted, the sign bit of the depth signal is applied to the blankers and inhibits the video and key signals in the event that the sign bit indicates that the depth signal has a negative value. When the on/off signal is not asserted, the wrap-around portions of the scene are not suppressed in accordance with the value of the sign bit.

In the above-mentioned co-pending application, it is explained how the priority of two video signals can be adjusted, causing one picture to overlay another, in dependence upon the value of a priority signal. The priority signal effectively weights the two key signals in complementary fashion so that by adjusting the value of the priority signal the effective relative value of the key signals can be changed.

As shown in FIG. 3, the output signal (DEPTH 1) of the processing circuit 56Z is applied to a subtraction circuit 90 which receives at its other input a signal (DEPTH 2) representing the depth of a second video signal VIDEO 2 which has an associated key signal KEY 2. The DEPTH 2 signal may be generated by a reverse address generator similar to that shown at 18 in FIG. 3, or it may be generated using actual depth information. The resulting relative depth signal is applied to a multiplier 92, in which the relative depth value is multiplied by a gain factor, which may range from zero to a very large value (e.g. 1024), and the output of the multiplier is applied to a subtraction circuit 94 in which it is offset by 0.5 and clipped to a range of 0.0 to 1.0. The offset and clipped signal is then applied to a shaper 96 in which it is shaped so that the resulting relative depth control signal has no slope discontinuities at zero or one. The relative depth control signal is applied to both the video mixer and the key mixer of the combiner 84, which is illustrated in simplified form in FIG. 3. The combiner 84 is set up so that VIDEO 1 is passed for a relative depth control value of zero, VIDEO 2 is passed for a relative depth control value of one, and a proportional mix is performed between the two video signal values for values between zero and one. The 0.5 offset provided by the subtraction circuit 94 ensures that equal apparent depths (which would result in a relative depth value of zero) will cause an equal mix of VIDEO 1 and VIDEO 2.

The video signal that is applied to the video channel 34 is an unshaped video signal, i.e. it has not been multiplied by an associated key signal. Preferably, the foreground video signal that is applied to the background mixer 32 is a shaped video signal. Shaping may be accomplished in a shadow processor, such as that disclosed in U.S. Pat. No. 4,689,681 issued Aug. 25, 1987, incorporated between the video channel 34 and the background mixer 82.

It will be appreciated that the present invention is not restricted to the particular embodiment that has been described and illustrated, and that variations may be made therein without departing from the scope of the invention as defined in the appended claims and equivalents thereof. For example, it is not essential to the invention that the depth control signal be generated by the reverse address generator of a reverse transform system and, as indicated in connection with the discussion of the inputs to the subtraction circuit 90, a signal representative of depth may be derived independently of the reverse transform generator, e.g. by a separate address generator. Use of data explicitly representing depth, instead of implicitly as in the case of the output of the reverse transform generator, has the advantage that it provides a more reliable indication of actual depth. Of course, the invention is not restricted to use in connection with a reverse transform system.

I claim:

1. A method of processing a video signal representing a scene, wherein the video signal has a key signal associated therewith, comprising combining the video signal with a second signal having a value which is a measure of depth of the scene as a function of position, the second signal being combined with the video signal by using the second signal to control the manner in which the first-mentioned key signal is mixed with a second key signal to generate a third key signal, the third key signal being used to control mixing of the first-mentioned video signal with a second video signal.

2. A method of processing a video signal representing a scene comprising combining the video signal with a second signal having a value which is a measure of depth of the scene as a function of position, wherein the video signal and the second signal are combined by subtracting the second signal from a third signal, the third signal having a value which is a measure of depth of a second scene represented by a second video signal as a function of position, to form a fourth signal having a value which is a measure of difference in depth of the two scenes, and using the fourth signal to control the mixing of the first-mentioned video signal with the second video signal.

3. Apparatus for processing a video signal comprising:
   a reverse address generator of a reverse transform system for providing a second signal having a value which is a measure of depth of a scene represented by the video signal as a function of position; and
   means for combining the video signal with the second signal.

4. Apparatus for processing a video signal comprising:
   means for providing a second signal having a value which is a measure of depth of a scene represented by the video signal as a function of position; and
   a video mixer having a first input port connected to receive the video signal, a second input port connected to receive a second video signal, and a control port connected to receive said second signal.

5. Apparatus for processing a video signal comprising:
   means for providing a second signal having a value which is a measure of depth of a scene represented by the video signal as a function of position; and
   a key mixer having a first input port for receiving a key signal associated with the video signal, a second input port for receiving a second key signal, a control port for receiving said second signal, and an output port for providing a third key signal.

6. Apparatus according to claim 5, further comprising mixing means connected to the output port of the key mixer for combining the first-mentioned video signal with a second video signal in dependance upon the third key signal.

7. Apparatus for processing a video signal comprising:

means for providing a second signal having a value which is a measure of depth of a scene represented by the video signal as a function of position;

a video mixer having a first input port for receiving the first-mentioned video signal, a second input port for receiving a second video signal, and a control port; and means for subtracting said second signal from a signal having a value which is a measure of depth of a scene represented by the second video signal as a function of position so as to provide a relative depth signal, the relative depth signal being applied to the control port of the video mixer.

8. Apparatus for processing a video signal comprising:

means for generating a first depth signal from a transformation function for the video signal, the first depth signal having a depth value for each pixel of a scene represented by the video signal;

means for generating a relative depth key signal from the first depth signal and a second depth signal, the second depth signal having a depth value for each pixel of a second scene represented by a second video signal; and means for combining the first-mentioned and second video signals and associated first and second key signals under control of the relative depth key signal to produce an intersecting planes video signal and a key output signal.

9. Apparatus as recited in claim 8 further comprising means for mixing the intersecting planes video signal with a third video signal under control of the key output signal to produce a processed video signal.

10. Apparatus for processing a video signal comprising:

means for generating a depth signal from a transformation function for the video signal, the depth signal having a depth value for each pixel of a scene represented by the video signal;

means for generating a perspective clip signal from the depth signal; and means for blanking the video signal and an associated key signal in response to the perspective clip signal when the perspective clip signal indicates that a portion of the scene is in front of a reference plane to produce clipped video and key signals.

11. Apparatus as recited in claim 10 further comprising means for mixing the clipped video signal with a second video signal under control of the clipped key signal to produce a processed video signal.

12. Apparatus for processing a video signal comprising:

means for generating a depth signal having a depth value for each pixel of a scene represented by the video signal;

means for generating a perspective dim key signal from the depth signal; and means for combining the video signal with a black signal under control of the perspective dim key signal to produce a dimmed video signal.

13. Apparatus as recited in claim 12 further comprising means for mixing the dimmed video signal with a second video signal under control of a key signal associated with the video signal to produce a processed video signal.

14. Apparatus as recited in claim 12 further comprising:

means for generating a perspective fade key signal from the depth signal; and means for combining a key signal associated with the video signal with a zero value signal under control of the perspective fade key signal to produce a fade key signal.

15. Apparatus as recited in claim 14 further comprising means for mixing the dimmed video signal with a second video signal under control of the fade key signal to produce a processed video signal.

16. Apparatus for processing a video signal comprising:

means for generating a depth signal having a depth value for each pixel of a scene represented by the video signal;

means for generating a perspective fade key signal from the depth signal; and means for combining a key signal associated with the video signal with a zero value signal under control of the perspective fade key signal to produce a fade key signal.

17. Apparatus as recited in claim 16 further comprising means for mixing the video signal with a second video signal under control of the fade key signal to produce a processed video signal.

18. A method of processing a video signal representing a scene comprising the steps of:

generating a depth signal from a transformation function for the video signal, the depth signal having a depth value for each pixel of the scene;

generating a perspective key signal from the depth signal; combining the video signal with a second signal under control of the perspective key signal to produce an output video signal; and combining a key signal associated with the video signal with a third signal under control of the perspective key signal to produce an output key signal.

19. A method as recited in claim 18 further comprising the step of mixing the output video signal with a second video signal under control of the output key signal to produce a processed video signal.

* * * * *